Dec. 17, 1968  J. M. HARRISON  3,417,173
METHOD AND APPARATUS FOR FOAM MOLDING
Filed Jan. 10, 1966
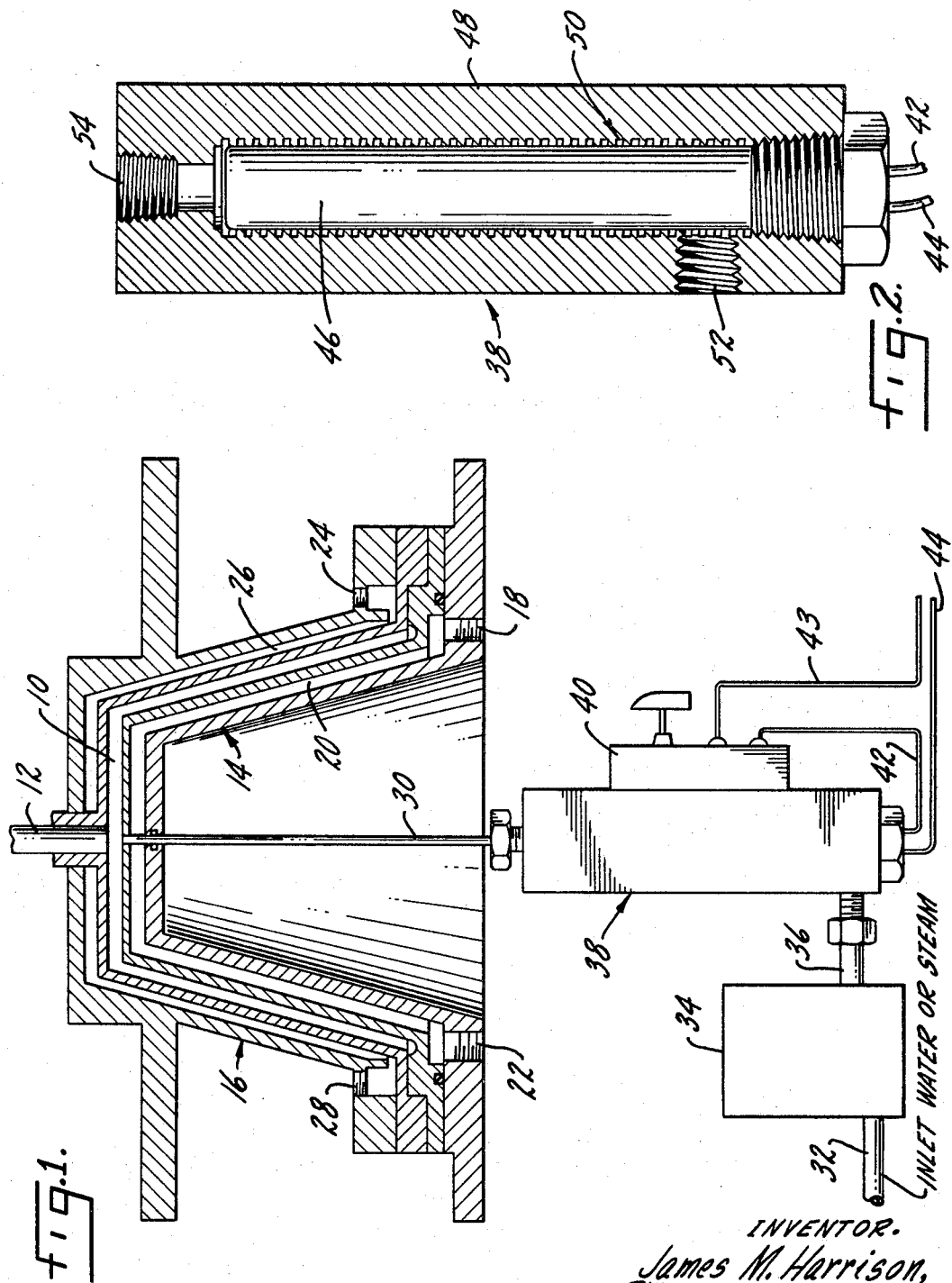
INVENTOR.
James M. Harrison,
BY Parker & Carter
Attorneys.

United States Patent Office 3,417,173
Patented Dec. 17, 1968

3,417,173
METHOD AND APPARATUS FOR
FOAM MOLDING
James M. Harrison, Fort Worth, Tex., assignor to Crown Machine & Tool Co., Arlington, Tex., a corporation of Texas
Filed Jan. 10, 1966, Ser. No. 519,722
1 Claim. (Cl. 264—53)

ABSTRACT OF THE DISCLOSURE

A method and apparatus for molding a plastic part from finely divided foamable plastic material which has been impregnated with a foaming agent; the apparatus includes means forming a mold cavity, means forming a first and second heating chamber adjacent the mold cavity, means for generating dry superheated steam, a conduit to direct the dry superheated steam into the mold cavity, and valve means to deliver a metered amount of water to the superheated steam generator. The method includes the steps of introducing the foamable plastic material into the mold cavity and then introducing relatively low temperature steam into the heating chambers while introducing a metered amount of dry superheated steam, which has been heated to a temperature substantially higher than the relatively low temperature steam, into the mold cavity.

---

This invention relates to a method and structure for molding divided plastic particles in an improved manner.

An important object of this invention is a method and structure whereby discrete plastic particles, such as polystyrene, which are impregnated with foaming agents, such as butane, may be molded in an improved way so that the molded product has improved properties, particularly improved cohesion between the plastic particles.

Another object is a method and structure which leads to improved molded plastic articles from discrete foamable plastics impregnated with raising agents wherein steam is delivered in an improved way into the molding cavity to attain enhanced cohesion of the foamed and molded particles, thereby leading to improved flexibility of the molded article.

Another object is a structure and apparatus whereby steam may be used to improve the molding operation of foamable discrete particles impregnated with raising agents without encountering undesirable levels of moisture formation within the molding cavity.

Another object is a method and structure wherein an article is molded from discrete foamable articles impregnated with raising agents by heating chambers surrounding the mold cavity and superheated steam is introduced directly into the molding cavity during the molding operation.

Another object is a method and structure wherein superheated steam is introduced in controlled amounts into a molding cavity where foamable plastic particles impregnated with raising agents are undergoing a molding operation induced by adjoining heating chambers.

Another object is a method and structure where superheated steam is used to improve the molding operation of foamable plastic particles impregnated with raising agents, and where the temperature of such superheated steam is thermostatically controlled.

Such objects are attained as well as other objects which will occur to practitioners who will consider the following disclosure of the invention. The disclosure comprises, in part, drawings wherein:

FIGURE 1 is a schematic side elevational view of the structure used to practice the method of the invention; and FIGURE 2 is a side elevational view, partly in section and on an enlarged scale, of the heater shown in FIGURE 1.

Foamable discrete particles such as polystyrene are widely used in molding operations, and such particles are impregnated with raising agents such as butane, pentane and other volatile agents. A charge of such particles are deposited in various molding cavities and heat is used to expand the articles, whereby they fill the mold cavity and assume the form of the finally molded article. Such a mold is illustrated in a part of FIGURE 1, and such selected mold, for convenience, is shown as one which will form foamed plastic containers or cups.

A molding chamber of molding cavity 10 receives the charge of plastic particles from a passageway with the help of a fill plunger such as 12. Adjoining heating chambers shown generally as 14 and 16 are adapted to be heated, preferably by a heating fluid such as steam, to mold the particles in the molding cavity. Chamber 14 can also be considered as a core shell which has an inlet 18 to receive steam in a chamber 20. An outlet 22 for the steam in the core shell is shown on the other side of this heating chamber. Heating chamber 16 may also be referred to as a cavity shell which has an inlet 24 to receive water or steam which passes into a chamber 26. An outlet 28 for the steam or water is present at the other side of the heating chamber 16.

During the molding operation, superheated steam is delivered into the molding cavity by way of tube or conduit 30 which empties directly into said molding cavity. Water or steam is delivered by tube 32 to heating water means in amounts controlled or metered by a valve 34 which may be a solenoid control valve. The controlled amount of water or steam from valve 34 is transferred by way of connection 36 into a superheater shown generally at 38. The heating level of the heater is preferably controlled by a thermostat 40 to which electrical power lead 42 is connected and power lead 44 by way of lead 43.

Referring to FIGURE 2, power leads 42, 44 are connected to an elongated heating element 46 in a body section 48. Surrounding the heating element is a spiral or helical path or passageway shown generally at 50. A coupling from conduit 36 is adapted to be engaged in threaded bore 52, and the water or steam delivered will be deposited in the proximal end of the spiral path. The thermostatically controlled heating element maintains a sufficient level of heat so that when the steam is discharged from the distal end of the spiral path into outlet coupling 54 it is dry and superheated. Threaded bore 54 is adapted to receive an appropriate coupling to be connected with tube 30.

The use and operation of my invention are as follows:
Steam is advantageously used during the molding operation to provide better cohesion between the discrete plastic particles which have expanded and cohered to one another. This improved cohesion leads to desirable properties in the finished molded product such as improved flexibility which is desirable in thin wall products such as containers. In the process, a metered amount or charge of superheated steam is delivered into the molding cavity during the molding operation. The temperature of such steam is maintained substantially above the level of the steam used to heat the heating chambers 14, 16. Such steam is advantageously heated to the desired level by using means such as the superheater 38 having its long spiral path surrounding the heating element 46. There is no critical temperature required in the superheated steam, but it should be heated to levels where the steam is substantially "dry," say about 400° F. Such dry, superheated steam substantially reduces the undesirable moisture content in the molding cavity. When steam is used as the heating source for the chambers 14, 16, it may be at a lower temperature and be "wet" steam. But the steam delivered into the molding cavity is substantially above that temperature level. Other heating means may be used for the heating chambers such as electric heating elements, but it is still required that superheated steam be directly introduced into the molding cavity during the molding operation.

The means illustrated to practice the method can be handled to obtain a more or less continuous operation for repeatedly molding articles. Water or steam can be continuously fed into the valve means which meters controlled amounts into the adjoining heater and the temperature of such heater is desirably maintained by means such as the thermostat to assure that the steam leaving the heater is at the desired superheated level. The introduction of the water or steam into the heater can be timed in sequence with the deposit of foamable discrete plastic particles into the molding cavity and with the heating of the adjoining chambers. The means for controlling the amount of steam which is delivered into the molding cavity has been shown as being placed at a point before the introduction of water or steam, but it may be otherwise. Various valve connections can be made at a place after the steam leaves the heater, say at the junction where the tube 30 empties into the molding cavity.

It will also be apparent that various modifications may be made, all of which fall within the spirit and scope of the invention which is limited only as defined in the appended claim.

What is claimed is:

1. An apparatus for molding foamable plastic material, such as polystyrene, containing a foaming agent, such as butane, said apparatus, including:

means forming a mold cavity and a passage thereto for delivery of the foamable plastic material to said mold cavity, means forming a first heating chamber on one side of said mold cavity having an inlet and an outlet, said inlet adapted to communicate said first heating chamber with a source of relatively low temperature steam, means forming a second heating chamber on the other side of said mold cavity having an inlet and an outlet, said inlet adapted to communicate said second heating chamber with a source of relatively low temperature steam, means for generating dry superheated steam having a temperature substantially above said relatively low temperature steam, a conduit communicating said superheated steam generating means with said mold cavity for delivery of superheated steam to said mold cavity, and valve means for delivery of a metered amount of water to said superheated steam generating means to thereby effect delivery of a metered amount of dry superheated steam to said mold cavity.

References Cited

UNITED STATES PATENTS

| 3,170,010 | 2/1965 | Schultz et al. | 264—51 |
| 3,261,055 | 7/1966 | Dart | 264—51 |
| 2,252,541 | 8/1941 | Arnold | 219—319 |
| 3,225,126 | 12/1965 | Bridges et al. | 264—51 |

OTHER REFERENCES

Statsny, Fritz, New Porous Synthetic, Styropor, BASF reprint from Kuntstoffe 44 (1954), No. 4, pp. 173–180, and No. 5, pp. 221–226, TP 986 S7S7SE (pp. 20–21 relied on). One copy in group 146.

JULIUS FROME, *Primary Examiner.*

L. GARRETT, *Assistant Examiner.*

U.S. Cl. X.R.

264—51; 18—5; 219—320